Dec. 30, 1930.   H. BENSMANN   1,787,353
REGENERATION OF LUBRICATING OILS
Filed Nov. 2, 1926
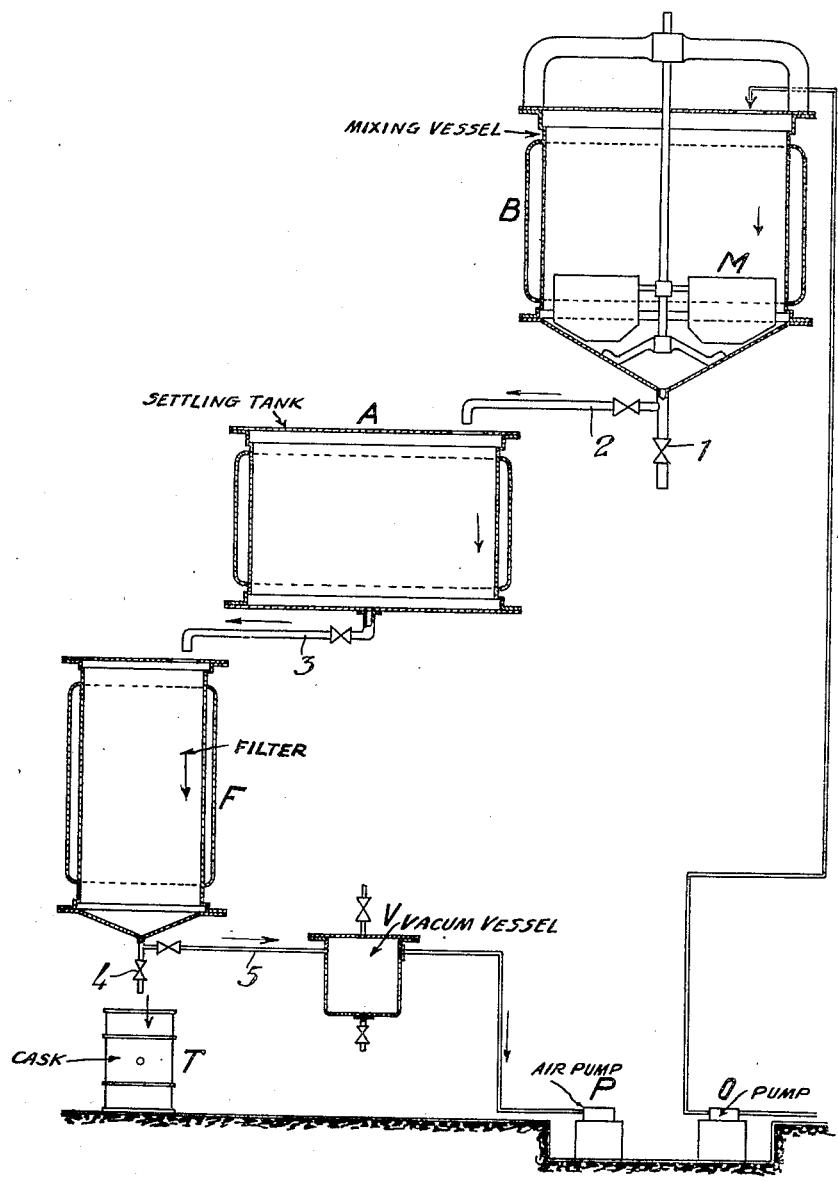
Inventor:
H. Bensmann
By: Marks & Clerk
Attys.

Patented Dec. 30, 1930

1,787,353

UNITED STATES PATENT OFFICE

HERMANN BENSMANN, OF BREMEN, GERMANY

REGENERATION OF LUBRICATING OILS

Application filed November 2, 1926, Serial No. 145,905, and in Germany March 25, 1926.

Lubricating oils, which are used in internal combustion engines or at points subjected to a high temperature, absorb impurities consisting of colloidally dispersed particles of soot and graphite and alter in condition to such an extent that they cannot be regenerated.

Attempts have been made to remove this colloidal carbon from the oil by centrifuges and filters of the most varied construction, which however are only successful to a completely inadequate extent, because the particles of carbon floating in the oil, owing to their small specific gravity, are not removed by centrifugal action and on the other hand, after a very short time all the filter materials which come into consideration are stopped up by these particles of soot and graphite and become impermeable.

Even if it were possible however to remove the carbon from the oils, the latter could only be used to a very subordinate degree for lubricating purposes because they contain considerable amounts of decomposition products (cracking products) which have formed under the influence of the high temperatures to which the oils were subjected in the motor.

By the process according to the invention it is possible wholly to eliminate both the carbon impurities as well as the decomposition products from the used oils, whereby they regain their original properties and can be again used for lubricating purposes.

An apparatus for carrying out the process according to the invention is illustrated diagrammatically by way of example in the accompanying drawing.

According to the invention used oils of this kind are treated with agents, which exert a polymerizing action upon the products of decomposition. These are thereby converted into asphalt-like substances, which are precipitated in the oil in the finest state of subdivision and sink to the bottom, at the same time carrying with them the colloidal carbon. In this way an oil is obtained which is completely free from particles of carbon and decomposition products. Such polymerizing agents are amongst others, tin tetrachloride, aluminium chloride, sulphuric acid, phosphoric acid.

The oil freed from carbon passes then through a filter, in which there is a suitable absorbent. The organic acids and tarry substances are thus removed and a regenerated oil obtained, which is equal in quality to fresh unused oil.

Example

The oil to be regenerated is pumped by means of a pump O into a mixing vessel B capable of being heated and provided with a conical bottom and stirring device M, and heated to 30–50° C., the stirring device M started and the polymerizing agent added. While gradually increasing the temperature to about 70° C. stirring is continued for about a half hour, then the sludge consisting of polymerization products and carbon, after settling, is drawn off through a tap 1, the oil freed from particles of carbon is led through a pipe 2 to a settling vessel A and there completely clarified from precipitate. The oil is then passed by means of a pipe 3 through a filter F, which can be heated and is charged with an absorbent, for instance an aluminium magnesium hydrosilicate. By this means the organic acids and tarry products are removed from the oil and it can be drawn off for further use through a tap 4 into suitable containers, for instance casks T.

Experience has shown that the special absorbent referred to above is especially suitable for the process according to the invention. For receiving the absorbent a filter cloth is arranged on a perforated tray as support for the finely granular absorbent. A vacuum vessel V is preferably connected by a pipe 5 with the filter, which vacuum vessel is used to withdraw by suction the oil left behind in the filter F by the absorbent. P is the air pump belonging thereto.

What I claim is:—

1. A process for the regeneration of used lubricating oils, more especially those which have absorbed impurities and decomposed to a considerable extent owing to having been used in internal combustion engines or at points exposed to high temperatures, consisting in first heating the oils to about 30° C., then gradually heating the said oils further to about 60–70° C. together with polymerizing agents, while stirring, in order to form asphaltlike substances from the decomposition products of the oil, drawing off the sludge, passing the oil through a settling vessel and treating the oil by means of a filter having a long filtering path with an aluminium magnesium hydrosilicate to remove the organic acids and tarry constituents.

2. A process for the regeneration of used lubricating oils, more especially those which have absorbed impurities and decomposed to a considerable extent owing to having been used in internal combustion engines or at points exposed to high temperatures, consisting in first heating the oils to about 30° C., then gradually heating the said oils further to about 60–70° C. together with sulphuric acid, while stirring, in order to form asphaltlike substances from the decomposition products of the oil, drawing off the sludge, passing the oil through a settling vessel and treating the oil by means of a fiber having a long filtering path with an aluminium magnesium hydrosilicate to remove the organic acids and tarry constituents.

In testimony whereof I have signed my name to this specification.

HERMANN BENSMANN.